3,185,214
RECOVERY OF OIL FROM SUBTERRANEAN FORMATIONS
George G. Bernard and Orrin C. Holbrook, Crystal Lake, Ill., assignors to The Pure Oil Company, Chicago, Ill., a corporation of Ohio
No Drawing. Filed Mar. 4, 1958, Ser. No. 718,954
1 Claim. (Cl. 166—9)

This invention relates to a method of recovering oil from formations beneath the earth's surface, and is more particularly concerned with a method of secondary recovery involving the use of surfactants.

It has been long known that the recovery of oil from producing formations beneath the earth's surface can be aided by incorporating in the flood water a surfactant. The surfactant has the ability to lower the surface tension between the oil and the water, enabling the flood water to remove a larger portion of the oil held in the pores of the formation than is otherwise possible.

The natural interfacial tension between most crude oils and available flood water ranges from 15 to 30 dynes/cm. By incorporating surfactants in the flood water in the conventional manner, the interfacial tension can be reduced to about 5 dynes/cm.

It is an object of this invention to provide an improved method for secondary recovery of oil from underground reservoirs. It is another object of the invention to recover larger amounts of oil remaining in underground reservoirs than has been heretofore possible. A still further object of the invention is to provide a method for maximum recovery of oil in petroleum reservoirs beneath the earth's surface. Further objects of the invention will develop from the following detailed description.

We have discovered a method whereby the interfacial tension can be reduced to a surface tension approaching zero, resulting in ultimate recoveries of oil approaching 100% of the oil remaining in place.

In accordance with our invention, a first reactant which is oil-soluble is introduced into the formation in the form of an oil solution, followed by the introduction of a water solution of a second reactant, which is able under the conditions existing in the formation to react with the first reactant and form a surfactant which is soluble in or readily dispersible in both oil and water. It is believed that the energy of the chemical reaction which takes place in situ assists in breaking down the interface and takes the place of a part of the free interfacial energy, resulting in an interfacial tension between the oil and water of the order of 0.04 dyne/cm.

In carrying out the invention, we first inject into the oil-containing formation through an injection well an oil solution of a reactive substance, namely, fatty acid, rosin acid, petroleum acid, or carboxylic acids produced by oxidation of petroleum having sufficiently long carbon chains to be soluble in the oil, and follow the injection of the oil solution with the injection of a water solution of an alkali metal hydroxide, preferably sodium hydroxide, in an amount to react with the acids previously injected. The alkali metal hydroxide may be added in either fresh water or brine. Care should be exercised not to use water containing substantial amounts of calcium or magnesium salts which cause the formation of insoluble precipitates with the fatty materials. Suitable acids which may be used are lauric, stearic, and sulfonated petroleum or castor oil. Other suitable acids are disclosed in Patents Nos. 2,233,382; 2,341,500; and 2,800,962.

Although the acidic reactant may be injected in solution in any material which is miscible with the oil in place, we prefer to use as the vehicle for the acid reactant a portion of the crude oil previously recovered.

In carrying out our invention, a solution containing from about 20 to 5000 parts per million of the acid reactant is injected in an amount equivalent to about 5–30 vol. percent of the oil in the reservoir. After the injection of the oil solution, there is injected approximately 5–30 vol. percent of water containing the second, water-soluble reactant, such as sodium hydroxide or ammonia. The total amount of second reactant is approximately equivalent to the amount of acid previously injected. After the injection of the second reactant is complete, flood water is injected in conventional manner until an uneconomical water-oil ratio is produced at the producing wells.

If desired, the water-soluble reactant can be injected in the entire flood water in the form of a highly diluted solution but we prefer to use a more concentrated water solution prior to the injection of flood water, which may or may not contain additional surfactant.

As a specific example of our invention, a reservoir from which about 50% of the anticipated oil content had been recovered by employing conventional water-flooding, is injected with 1,000,000 bbl. of produced crude oil from the formation, equivalent to 20 vol. percent of the oil remaining in the reservoir. This crude oil contains 1000 parts per million of oleic acid. Following the injection of the oleic acid-containing crude oil, an equal amount of water containing 5% of sodium hydroxide is injected. After the injection of the sodium hydroxide solution is completed, injection of flood water is resumed at a pressure of approximately 500 lbs./sq. in. until the ratio of water to oil at the producing wells reaches 100 to 1. In addition to the injected oil, about 90% of the oil remaining in the reservoir is recovered.

Although the invention has been described in conjunction with the use of an oil-soluble acid and a water-soluble alkali, it should be understood that the invention is applicable to the use of any oil-soluble reactant and any water-soluble reactant which will react with each other under formation conditions to form a surfactant for the oil and water. For example, where the formation temperatures are sufficiently high, combinations of an oil-soluble acid or acid amide, such as ricinoleic acid or the amide thereof, may be used in conjunction with a water solution of ethylene oxide to form surfactants such as those disclosed in Patent No. 2,233,382.

As previously pointed out, we prefer to use the two reactants in amounts which are about equivalent to each other stoichiometrically, but it should be understood that an excess of either reactant over the other may be used, so long as enough of each reactant is present to form a substantial amount of surfactant in situ.

We claim as our invention:

The method of recovering petroleum oil from natural reservoirs consisting in injecting through an injection well into the oil-containing formation a solvent miscible with the oil in the reservoir in an amount equivalent to about 5–30 volume percent of the oil in the reservoir, said solvent containing in solution from about 20 to 5000 parts per million of a first reactant selected from the group consisting of ricinoleic acid and ricinoleic acid amine, injecting into the reservoir, immediately after said first reactant, an aqueous solution of a second reactant, namely, ethylene oxide, in an amount of 5 to 30 volume percent of the oil in the reservoir, said second reactant being capable under reservoir conditions of reacting with said first reactant to form a surfactant and being present in an amount about stoichiometrically equivalent to the first reactant, and thereafter injecting water free of surfactant in sufficient quantity to produce oil from the reservoir.

References Cited by the Examiner

UNITED STATES PATENTS

| | | | |
|---|---|---|---|
| 2,233,382 | 2/41 | De Groote et al. | 252—8.55 |
| 2,341,500 | 2/44 | Detling | 166—9 |
| 2,669,306 | 2/54 | Teter et al. | 166—9 |
| 2,802,784 | 8/57 | Nowak et al. | 166—42 |
| 2,825,409 | 3/58 | Ring | 166—42 |
| 2,920,041 | 1/60 | Meadors | 166—9 |

OTHER REFERENCES

"Surface Active Agents," Schwartz and Perry, 1949 Edition, Interscience Publishers, page 25.

CHARLES E. O'CONNELL, *Primary Examiner.*

BENJAMIN HERSH, BENJAMIN BENDETT,
*Examiners.*